United States Patent [19]
Miyaoh et al.

[11] Patent Number: 5,348,311
[45] Date of Patent: Sep. 20, 1994

[54] METAL LAMINATE GASKET WITH FIXING DEVICES

[75] Inventors: Yoshio Miyaoh; Katsuji Aoki, both of Tokyo, Japan

[73] Assignee: Ishikawa Gasket Co., Ltd., Tokyo, Japan

[21] Appl. No.: 110,759

[22] Filed: Aug. 23, 1993

Related U.S. Application Data

[63] Continuation of Ser. No. 827,980, Jan. 31, 1992, abandoned.

[30] Foreign Application Priority Data

Feb. 19, 1991 [JP] Japan .............. 3-031722[U]
Feb. 19, 1991 [JP] Japan .............. 3-031723[U]

[51] Int. Cl.$^5$ ........................... F16J 15/08
[52] U.S. Cl. ........................ 277/9; 277/235 B
[58] Field of Search .......... 277/235 B, 235 R, 236, 277/234, 9, 166, 189; 403/375, 280, 274, 283, 393; 29/888.3, 509, 513, 521, 505

[56] References Cited

U.S. PATENT DOCUMENTS

| | | | |
|---|---|---|---|
| 548,483 | 10/1895 | Vogel | 29/513 |
| 995,691 | 6/1911 | Latham | 29/521 |
| 1,141,046 | 5/1915 | Dubus | 29/521 |
| 2,135,807 | 11/1938 | Fitzgerald | 29/509 |
| 4,451,051 | 5/1984 | Nicholson | 277/235 B |
| 4,776,601 | 10/1988 | Yamada | 277/235 B X |
| 4,788,395 | 11/1988 | Sakoda | 29/513 X |

FOREIGN PATENT DOCUMENTS

| | | | |
|---|---|---|---|
| 0574429 | 7/1988 | Australia . | |
| 0078772 | 4/1919 | Austria | 277/235 |
| 2009893 | 8/1990 | Canada . | |
| 0383993 | 6/1989 | European Pat. Off. . | |
| 1414951 | 9/1965 | France . | |
| 2426506 | 1/1980 | France | 29/509 |
| 0190737 | 5/1981 | Japan | 277/235 B |
| 0190736 | 11/1982 | Japan | 29/505 |
| 0190738 | 11/1982 | Japan | 29/521 |
| 0129468 | 5/1990 | Japan | 277/235 R |
| 1072958 | 2/1984 | U.S.S.R. | 29/509 |
| 2072059 | 9/1981 | United Kingdom . | |

Primary Examiner—William A. Cuchlinski, Jr.
Assistant Examiner—Scott W. Cummings
Attorney, Agent, or Firm—Kanesaka & Takeuchi

[57] ABSTRACT

A metal laminate gasket of the invention is basically formed of first and second metal plates laminating together, and a plurality of fixing devices for connecting the first and second metal plates. The fixing devices are formed inside the gasket at the portions where sealing ability of the gasket is not affected. Each fixing device is formed of a hole formed in the first plate and a bending strip formed in the second plate. The bending strip is located under the hole of the first plate and is formed by partly cutting the second plate. When the first and second plates are assembled, the bending strip extends through the hole of the first plate and is located above the first plate.

8 Claims, 1 Drawing Sheet

METAL LAMINATE GASKET WITH FIXING DEVICES

CROSS REFERENCE TO RELATED APPLICATION

This application is a continuation of application Ser. No. 827,980, filed on Jan. 31, 1992, now abandoned.

BACKGROUND OF THE INVENTION AND RELATED ART STATEMENT

The Present invention relates to a metal laminate gasket with fixing devices for connecting the metal plates together.

A metal laminate gasket is formed of a plurality of metal plates laminated with each other. In the metal laminate gasket, after all the metal plates are prepared, the metal plates are laminated and connected together.

As a method of connecting the metal platens, the metal plates may be welded by spot welding, which requires special tools. In case grommets are used around holes, the grommets may be used for connecting the plates, by which all the plates may not be precisely aligned.

Also, plates may be connected together as shown in FIG. 1, wherein a gasket 10 has a lower plate 11 with a bending portion 11a at an outer edge of the gasket, which is turned and located above an upper plate 12 to connect the plates together. A middle plate 13 does not extend to the outer edge so that the bending portion 11a does not project outwardly beyond a main outer surface of the upper plate 12.

In the gasket 10, since the bending portion 11a to be located above the upper plate 12 is formed in the lower plate 11 to extend outwardly from a main portion of the lower plate 11, it requires extra metal for forming the bending portion. Also, because of the projection or bending portion 11a, a raw metal plate for forming the lower plates 11 by cutting can not be efficiently utilized. Namely, a large amount of unused metal strips is formed when forming the lower plates. Further, since the bending portion 11a is simply located on the upper plate 12, although the plates 11, 12 do not move or slide in the direction perpendicular to the edges of the gasket 10 shown in FIG. 1, the plates 11, 12 may slide in the direction parallel to the edges of the gasket.

The conventional method in utilizing the bending portion has disadvantages. However, the gasket may be easily connected together by bending a part of the plate.

Accordingly, one object of the invention is to provide a metal laminate gasket, which can be easily and effectively connected together by utilizing bending portions.

Another object of the invention is to provide a metal laminate gasket as stated above, wherein a raw metal plate is effectively utilized without forming a large amount of unused metal strips.

Further objects and advantages of the invention will be apparent from the following description of the invention.

SUMMARY OF THE INVENTION

In accordance with the present invention, a metal laminate gasket is formed of first and second metal plates extending substantially throughout an entire area to be sealed. A plurality of fixing means for connecting the first and second metal plates together is formed inside the metal laminate gasket at portions where sealing ability of the gasket is not affected.

Each fixing means includes a hole formed in the first plate and a bending strip formed in the second plate. The bending strip is located under the hole of the first plate and is formed by partly cutting the second plate. When the first and second plates are assembled, the bending strip is bent to be located above the first plate to thereby immovably connect the first and second plates together.

In the present invention, the hole and the bending strip are formed inside the gasket. Namely, there is no projection extending outwardly from the gasket main portion for forming the bending strip. Therefore, when the first and second plates are cut or fabricated from a raw metal plate, the raw metal plate can be effectively utilized without a large amount of unused cutting parts.

At least two fixing means are formed in the gasket. One bending strip of one fixing means is bent in one direction, while the other bending strip of the other fixing means is bent in the opposite direction. If three or more fixing means are formed in the gasket, all the bending strips are bent in different directions. Accordingly, the first and second plates do not disengage from each other, and the plates can be precisely fixed without movement.

A third metal plate may be situated between the first and second metal plates. In this case, the third metal plate has a hole corresponding to the hole of the first plate, and a notch situated adjacent the hole and under a part of the bending strip located on the first metal plate.

When the gasket is assembled, a part of the first plate is compressed to enter into the notch and the bending strip is disposed in the compressed portion to prevent the bending strip from projecting beyond an outer surface of the first plate.

Preferably, the notch of the third plate is made larger than the bending strip located on the first plate. Also, the thickness of the third plate is made greater than the thickness of the second plate.

DETAILED DESCRIPTION OF PREFERRED EMBODIMENTS

Figure 1:
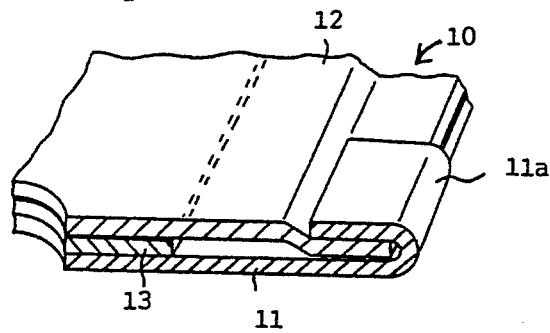
FIG. 1 is a perspective view for showing a part of a conventional gasket.
Figure 2:
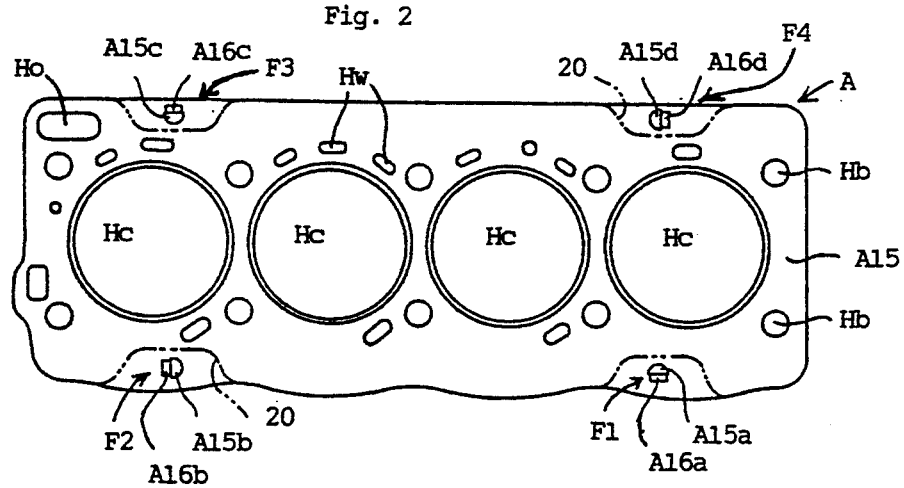
FIG. 2 is a plan view of a first embodiment of a metal laminate gasket of the invention.
Figure 3:
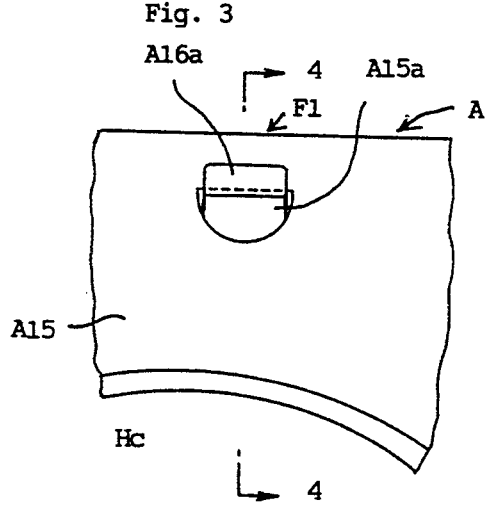
FIG. 3 is an enlarged plan view for showing one connecting portion shown in FIG. 2.
Figure 4:
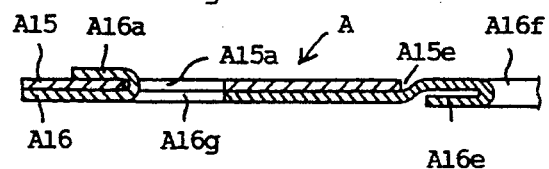
FIG. 4 is a section view taken along line 4—4 in FIG. 3.

Referring to FIGS. 2–4, a first embodiment A of a metal laminate gasket of the invention is shown. The gasket A is a cylinder head gasket and includes cylinder bores Hc, water holes Hw, an oil hole Ho, bolt holes Hb and so on, as in the conventional gasket.

In the present invention, sealing mechanisms for sealing around the cylinder bores Hc, water holes Hw and oil hole Ho are not the subject matter. Although the sealing mechanism for the cylinder bore Hc is shown in FIG. 4, any other sealing mechanisms may be used. Also, any sealing mechanisms may be used for sealing around the water holes Hw and the oil hole Ho.

As shown in FIGS. 2-4, the gasket A is formed of an upper plate A15 and a lower plate A16, which extend substantially throughout the entire area of a cylinder head and a cylinder block (both not shown).

The gasket A further includes four fixing mechanisms F1, F2, F3, F4 near four corners thereof. In particular, the upper plate A15 includes holes A15a, A15b, A15c, A15d, while the lower plate includes bending strips A16a, A16b, A16c, A16d. The bending strips A16a, A16b, A16c, A16d pass through the respective holes A15a, A15b, A15c, A15d, and are bent over the upper plate A15.

The bending strips A16a, A16b, A16c, A16d are bent in different directions, i.e. changing 90 degrees, so that the plates A15, A16 do not disengage from nor move with each other. Namely, the bending strips pass through the respective holes, wherein inner edges of each hole may contact outer edges of each bending strip. Therefore, slide or movement of the upper and lower plates can be effectively prevented.

The hole A15a and the bending strip A16a constitute the fixing mechanism F1. Similarly, the holes A15b, A15c, A15d and the corresponding bending strips A16b, A16c, A16d constitute the fixing mechanisms F2, F3, F4, respectively.

The fixing mechanisms F1-F4 are formed exactly the same, but the directions of the fixing mechanisms, i.e. the bending directions of the bending strips, are different, for example, 90°. For further explanation, the fixing mechanism F1 is explained with reference to FIGS. 3 and 4.

The upper plate A15 includes the hole A15a, and a hole A15e for the cylinder bore Hc. The lower plate A16 includes the bending strip A16a, a sealing portion A16e, and a hole A16f for the cylinder bore Hc. The sealing portion A16e is located inside the hole A15e and seals around the cylinder bore Hc.

When the fixing mechanisms are formed, the holes A15a-A15d are formed in the upper plate A15, while the bending strips A16a-A16d are cut in three sides respectively. Then, the bending strips A16a-A16d are bent perpendicularly to the lower plate A16. Consequently, a hole A16g is formed in the lower plate A16. After the upper and lower plates A15, A16 are assembled so that the bending strips A16a-A16d pass through the holes A15a-A15d, the bending strips A16a-A16d are bent in the different directions. Accordingly, the plates A15, A16 can be immovably connected together.

In the gasket A, the bending strips project beyond an outer surface of the upper plate A15. In order that the bending strips do not affect sealing ability of the gasket, the fixing mechanisms F1-F4 are formed at portions corresponding to dents 20 of the cylinder head or the cylinder block.

Figure 5:
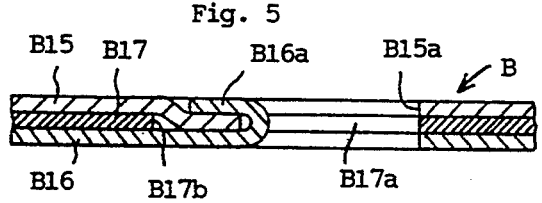
FIG. 5 is a section view, similar to FIG. 4, for showing a second embodiment of the gasket of the invention.

FIG. 5 shows a second embodiment B of the metal laminate gasket of the invention. The gasket B is formed of an upper plate B15 with a hole B15a, and a lower plate B16 with a bending strip B16a, as in the gasket A. However, the gasket B further includes a middle plate B17 between the upper and lower plates B15, B16.

The middle plate B17 includes a hole B17a corresponding to the hole B15a, and a notch B17b situated under the bending strip B16a. The notch B17b is slightly larger than the bending strip B16a. Therefore, when the gasket B is compressed for assembly, a part of the upper plate B15 under the bending strip B16a enters into the notch B17b, and the bending strip B16a enters into the compressed portion of the upper plate B15.

In the gasket B, the thickness of the middle plate B17 is substantially the same as that of the bending strip B16a or the lower plate B16. Therefore, when the gasket is assembled, the bending strip B16a does not project beyond the upper surface of the upper plate B15. If a plurality of middle plates with notches is installed between the upper and lower plates, the total thickness of the middle plates at the notches may be greater than the thickness of the bending strip.

In the gasket B, the bending strips do not project outwardly. Therefore, even if there is no dent in the cylinder block or cylinder head, the gasket B can be installed between the cylinder block and the cylinder head without affecting sealing ability of the gasket.

In accordance with the present invention, the fixing mechanisms are located inside the gasket, by which the plates can be immovably connected together. Also, since the fixing mechanisms are formed by the bending strips and the holes formed inside the plates, no extra machine or mechanism is used. The fixing mechanisms can be easily and economically formed.

While the invention has been explained with reference to the specific embodiments of the invention, the explanation is illustrative and the invention is limited only by the appended claims.

What is claimed is:

1. A metal laminate gasket with fixing devices, comprising, first and second metal plates extending substantially throughout an entire area to be sealed, said first and second metal plates laminating with each other for constituting the metal laminate gasket having four side edges, and four fixing means for connecting the first and second metal plates formed inside the side edges of the metal laminate gasket at portions where sealing ability of the gasket is not affected, each fixing means consisting of a hole formed inside the first plate and a bending strip formed inside the second plate, said bending strip being located under the hole of the first plate and formed of a part of the second plate so that when the first and second plates are assembled, the bending strip extends through the hole of the first plate and is located above the first plate, said four fixing means being situated near the side edges of the gasket and disposed away from each other, said bending strips of the four fixing means being oriented in four directions different at 90 degrees with each other to thereby immovably connect the first and second plates together.

2. A metal laminate gasket according to claim 1, wherein said gasket is disposed between two engine parts with depressions, said fixing means being located in the depressions of the engine parts when the gasket is installed between the engine parts.

3. A metal laminate gasket according to claim 1, further comprising a third metal plate situated between the first and second metal plates, said third metal plate having a hole corresponding to the hole of the first plate and a notch situated adjacent the hole thereof and under a part of the bending strip located on the first metal plate so that when the gasket is assembled, a part of the first plate is compressed to enter into the notch and the bending strip is disposed in a compressed portion to prevent the bending strip from projecting beyond an outer surface of the first metal plate.

4. A metal laminate gasket according to claim 3, wherein said notch of the third metal plate is larger than the bending strip located on the first metal plate.

5. A metal laminate gasket according to claim 4, wherein thickness of the third metal plate is greater than thickness of the second metal plate so that the bending strip formed by the second metal plate does not project outwardly when compressed.

6. A metal laminate gasket according to claim 1, wherein said hole of the fixing means formed in the first plate has a semicircular shape with a straight edge and a curved edge, said straight edge being arranged parallel to one of two side edges close to the hole and contacting the bending strip.

7. A metal laminate gasket with fixing devices, comprising,
   first and second metal plates extending substantially throughout an entire area to be sealed, said first and second metal plates being piled together for constituting the metal laminate gasket having four side edges,
   four fixing means for connecting the first and second metal plates formed inside the side edges of the metal laminate gasket at portions where sealing ability of the gasket is not affected, each fixing means including a hole formed in the first plate and a bending strip formed in the second plate and located under the hole of the first plate, each bending strip being formed of a part of the second plate and defined by slits in the second plate so that when the first and second plates are assembled, the bending strip extends through the hole of the first plate and is located above the first plate, said four fixing means being situated near different four corners of the gasket and disposed away from each other, said bending strips of the four fixing means being oriented outwardly in four directions different at 90 degrees with each other to thereby immovably connect the first and second plates together, and
   a third metal plate situated between the first and second metal plates and extending substantially throughout an entire area of the gasket, said third metal plate having four holes corresponding to the holes of the first plate and four notches situated adjacent the respective holes, each notch being located under a part of each bending strip located on the first metal plate so that when the gasket is assembled, a part of the first plate is compressed by the bending strip to enter into the notch and the bending strip is disposed in a compressed portion to prevent the bending strip from projecting beyond an outer surface of the first metal plate, said one hole and one notch of the third plate together with the one hole of the first plate and the one bending strip of the second plate consisting said one fixing means.

8. A metal laminate gasket according to claim 7, wherein said hole of the fixing means formed in the first plate has a semicircular shape with a straight edge and a curved edge, said straight edge being arranged parallel to one of two side edges close to the hole and contacting the bending strip.

* * * * *